United States Patent
Porta et al.

(10) Patent No.: US 12,411,098 B2
(45) Date of Patent: Sep. 9, 2025

(54) SYSTEM AND METHOD FOR DETERMINING MASS FRACTIONS IN A TEST SAMPLE WITH WAVE-LENGTH DISPERSIVE X-RAY FLUORESCENCE SPECTROMETERS

(71) Applicant: Bruker AXS SE, Karlsruhe (DE)

(72) Inventors: Dominique Porta, Karlsruhe (DE); Fabian Nitsche, Wörth am Rhein (DE)

(73) Assignee: Bruker AXS SE, Karlsruhe (DE)

( * ) Notice: Subject to any disclaimer, the term of this patent is extended or adjusted under 35 U.S.C. 154(b) by 207 days.

(21) Appl. No.: 18/316,802

(22) Filed: May 12, 2023

(65) Prior Publication Data

US 2023/0366840 A1    Nov. 16, 2023

(51) Int. Cl.
| | | |
|---|---|---|
| *G01N 23/223* | (2006.01) | |
| *G01N 23/2208* | (2018.01) | |
| *G01N 23/2209* | (2018.01) | |

(52) U.S. Cl.
CPC ....... *G01N 23/223* (2013.01); *G01N 23/2208* (2013.01); *G01N 23/2209* (2018.02);
(Continued)

(58) Field of Classification Search
CPC ............. G01N 23/223; G01N 23/2208; G01N 23/2209; G01N 2223/072;
(Continued)

(56) References Cited

U.S. PATENT DOCUMENTS

| | | | |
|---|---|---|---|
| 7,592,591 B2* | 9/2009 | Notoya | G01N 23/2209 250/306 |
| 7,720,192 B2* | 5/2010 | Hegeman | G01N 23/223 378/44 |

(Continued)

FOREIGN PATENT DOCUMENTS

| | | |
|---|---|---|
| EP | 1978354 A1 | 10/2008 |
| EP | 3550293 A1 | 10/2019 |

(Continued)

OTHER PUBLICATIONS

European Search Report for Application No. 22173365.2, mailed on Oct. 14, 2022, 5 pages.

(Continued)

*Primary Examiner* — Thomas R Artman

(74) *Attorney, Agent, or Firm* — Brake Hughes Bellermann LLP

(57) ABSTRACT

System, method and computer program product for determining mass fractions of one or more elements in a test sample based on a measurement with a wave-length dispersive x-ray fluorescence (WDX) spectrometer measuring gross intensities associated with respective elements with to-be-determined mass fractions (MFi) in the test sample. A mass fraction module determines mass fractions (MFi) by using a calibration equation (CE1) with the respective measured gross intensity and a respective calculated scattering efficiency as inputs. The calibration equation (CE1) associates net intensities of characteristic fluorescence lines of the sample elements with respective mass fractions. The (Continued)

net intensity for a particular peak is obtained by subtracting a respective calculated scattering efficiency times a scaling factor from the calibration equation (CE1) from the measured gross intensity of the particular peak. The elemental composition of the test sample is determined either via an iteration module or via an EDX quantification module.

20 Claims, 8 Drawing Sheets

(52) U.S. Cl.
CPC ............... *G01N 2223/072* (2013.01); *G01N 2223/0763* (2013.01); *G01N 2223/1016* (2013.01); *G01N 2223/3037* (2013.01); *G01N 2223/304* (2013.01); *G01N 2223/624* (2013.01); *G01N 2223/652* (2013.01)

(58) Field of Classification Search
CPC ... G01N 2223/0763; G01N 2223/1016; G01N 2223/3037; G01N 2223/304; G01N 2223/624; G01N 2223/652
See application file for complete search history.

(56) References Cited

U.S. PATENT DOCUMENTS

| | | | |
|---|---|---|---|
| 7,961,842 B2 | 6/2011 | Kawahra et al. | |
| 8,433,035 B2* | 4/2013 | Watanabe | G01N 23/223 378/46 |
| 8,582,717 B2* | 11/2013 | Ohzawa | G01N 23/223 378/45 |
| 9,448,191 B2* | 9/2016 | Utaka | G01N 23/223 |
| 9,739,730 B2* | 8/2017 | Hegeman | G01N 23/223 |
| 10,514,346 B2* | 12/2019 | Sako | G01N 23/2076 |
| 11,678,803 B1* | 6/2023 | Nitsche | A61B 5/0075 378/44 |
| 11,782,000 B2* | 10/2023 | Kataoka | G01N 23/2208 378/44 |
| 2008/0067379 A1* | 3/2008 | Notoya | G01N 23/2209 250/310 |
| 2008/0310587 A1* | 12/2008 | Hegeman | G01N 23/223 378/44 |
| 2009/0041184 A1* | 2/2009 | Kawahara | G01N 23/223 378/45 |
| 2011/0103547 A1 | 5/2011 | Ohzawa | |
| 2011/0243301 A1* | 10/2011 | Watanabe | G01N 23/223 378/46 |
| 2013/0170613 A1 | 7/2013 | Utaka et al. | |
| 2016/0258892 A1* | 9/2016 | Hegeman | G01N 23/223 |
| 2019/0302041 A1* | 10/2019 | Sako | G01N 23/207 |
| 2023/0060446 A1* | 3/2023 | Kataoka | G01N 23/223 |
| 2023/0366840 A1* | 11/2023 | Porta | G01N 23/2209 |

FOREIGN PATENT DOCUMENTS

| | | |
|---|---|---|
| JP | 2006292399 A | 10/2006 |
| WO | 2021161631 A1 | 8/2021 |

OTHER PUBLICATIONS

N. Broll et al.: "Matrix correction in x-ray fluorescence analysis by the effective coefficient method," X-Ray Spectrometry, vol. 21, Issue 1, Jan./Feb. 1992, pp. 43-49, https://doi.org/10.1002/xrs.1300210111.

C. Feather et al.: "A simple method for background and matrix correction of spectral peaks in trace element determination by X-ray fluorescence spectrometry," X-Ray Spectrometry, vol. 5, Issue 1, Jan. 1976, pp. 41-48, https://doi.org/10.1002/xrs.1300050110.

* cited by examiner

SYSTEM AND METHOD FOR DETERMINING MASS FRACTIONS IN A TEST SAMPLE WITH WAVE-LENGTH DISPERSIVE X-RAY FLUORESCENCE SPECTROMETERS

CROSS-REFERENCE TO RELATED APPLICATIONS

The application claims priority to EP Patent Application No. 22173365.2, filed on May 13, 2022, and entitled "System and method for determining mass fractions in a test sample with wave-length dispersive x-ray fluorescence spectrometers," the disclosure of which is hereby incorporated by reference in its entirety.

TECHNICAL FIELD

The present description generally relates to wave-length dispersive x-ray fluorescence spectroscopy, and more particularly relates to determining mass fractions of elements in a test sample from a spectrum of a wave-length dispersive x-ray fluorescence (WDX) spectrometer. The terms mass fraction of an element and concentration of an element are used as synonyms herein.

BACKGROUND

In wave-length dispersive x-ray fluorescence (WDX) spectroscopy, an x-ray tube generates polychromatic primary radiation including characteristic lines of the tube material and Bremsstrahlung. The primary radiation is directed on a sample to be analyzed. The primary radiation generates x-ray fluorescence (XRF) emissions that are characteristic for the elements contained in the sample. Additionally, the primary radiation is scattered by the sample. The radiation coming from the sample (secondary radiation) is dispersed by a monochromator (typically a crystal) in the center of a goniometer, that allows various diffraction angles θ. This technique is based on Bragg's law (equation F1):

$$n\lambda = 2d \sin \theta, \quad (F1)$$

where n is the diffraction order, λ the wavelength and d the lattice plane distance of the monochromator.

The wavelength can be transferred to energy by equation F2:

$$E = \frac{hc}{\lambda} \approx \frac{12.398 \text{ keV\AA}}{\lambda} \quad (F2)$$

$Ic = aI_{net}$. To quantify the concentration c (mass fraction) of a particular element in an unknown sample, the characteristic fluorescence intensity of said element must be correlated to the concentration of the element by a conversion factor (slope) a:

$$Ic = aI_{net} \quad (F3)$$

There may be additional corrections in equation F3, such as for example overlap and/or matrix corrections (known by a person skilled in the art) which are not discussed here for reasons of simplicity. The conversion factor (and potential further correction factors) is determined in a calibration step, where calibration samples with known concentrations of elements (mass fractions) to be analyzed are measured and the conversion factor is adjusted in such a way that the mass fractions calculated from the measured intensities by equation F3 best match the known mass fractions of the calibration samples.

$I_{net}) I_{backgr} I_{peak} I_{net} = I_{peak} - I_{backgr}$. However, in the spectrum of an XRF spectrometer the characteristic fluorescence intensities of the elements are superimposed with other intensities referred to as background. The relevant net intensity (for a particular element can be determined by subtracting the background ( ) from the intensity measured at the position of the peak of the respective fluorescence line of the element ( ):

$$I_{net}) I_{backgr} I_{peak} I_{net} = I_{peak} - I_{backgr}. \quad (F4)$$

Since the background under the peak is not directly accessible, it is interpolated or extrapolated from intensities measured before and/or after the respective peak.

While the spectrometer can scan a wide range of angles to produce a spectrum of a test sample, in practical application only single points are measured to get good accuracy in the shortest time possible. In other words, many applications (e.g., WDX spectroscopy used in steel production) are very time critical to avoid the necessity to stop a production line while waiting for the measurement and evaluation of the product composition. Nevertheless, besides the intensities at the peak positions, additional points for the background intensities need to be measured by prior art approaches, thus adding to the overall measurement time.

A further problem of prior art approaches when using background points is to find a region in the spectrum where the background intensity can be determined in an undisturbed way because typically multiple characteristic fluorescence peaks of the multiple elements in the test sample are present in the vicinity of the peak to be analyzed thus hiding the background intensities. To overcome this problem, prior art approaches typically increase the resolution of the measurement by using a different crystal (e.g., LiF220 instead of LiF200), or by using a smaller collimator that restricts the angular divergence of the beam hitting the monochromator. However, both approaches reduce the overall intensity quite significantly and thus increase again the overall measurement time.

Another prior art approach to remedy this problem was published in 1976 by Feather and Willis in "A simple method for background and matrix correction of spectral peaks in trace element determination by X-ray fluorescence spectrometry. This approach uses measured background intensities of blanks (calibration samples not containing the analyte) and corrects these for matrix effects either by calculating the mass absorption coefficient or by measuring the Compton scattered tube line. That is, this approach calculates sample specific backgrounds by using dedicated samples that do not contain the analyte (blank samples) during calibration. It is thus increasing the efforts necessary during calibration and evaluation. Further, it is only applicable where blank samples are readily available.

SUMMARY

There is therefore a need for systems and methods that provide mass fractions of one or more elements in a test sample by using a wavelength-dispersive X-ray fluorescence spectrometer reducing measurement time to a minimum with low efforts during calibration and evaluation. In particular, in time critical production processes (e.g., steel production) the measurement time for determining such mass fractions needs to be reduced to the shortest possible time interval. This problem is solved by the features according to the independent claims by eliminating the necessity to measure background points thus reducing the overall measurement time needed to evaluate an unknown sample. Additionally, the claimed description allows to use a lower resolution of the WDX spectrometer, thus further allowing for higher overall intensities with shorter measurement times.

In WDX spectroscopy the background is dominated by the scattered radiation from the x-ray tube on the sample ($I_{scatter}$):

$$I_{backgr} = b\, I_{scatter} \tag{F5}$$

where b is a scaling factor accounting for device parameters of the spectrometer for a given instrument geometry.

The herein disclosed approach is based on a calculated scattered radiation using the sample composition (i.e., the elemental composition of the sample specified by the mass fractions of the elements included in the sample) as a base for calculation. Gaining the knowledge of the sample composition can be achieved by using an iterative procedure or by measuring the sample using an additional energy-dispersive X-ray (EDX) detector as described in detail further down below.

The intensity of the scattered radiation for a given incidence intensity ($I_{incidence}$), energy (E), and sample composition (c) can be calculated according to:

$$I_{scatter} = I_{incidence} s(c,E) \tag{F6}$$

where s represents the function calculating the scattering efficiency being defined as the ratio between incoming intensity and scattered intensity for a given sample composition and energy (for a given instrument geometry).

Utilizing the calibration equation F3 from above for determining the mass fraction $c_i$ for a particular element i leads to:

$$\begin{aligned} c_i &= a_i I_{net,i} = a_i (I_{peak,i} - I_{backgr,i}) \\ &= a_i (I_{peak,i} - b_i I_{scatter,i}) \\ &= a_i (I_{peak,i} - b_i I_{incidence,i} s(c, E_i)) \end{aligned} \tag{F7}$$

Since $I_{incidence,i}$ is independent on the sample composition it can be combined with the calibration parameter $b_i$ to form:

$$c_i = a_i (I_{peak,i} - d_i s(c,E)) \tag{F8}$$

where $d_i = b_i I_{incidence,i}$. Thereby, $c_i$ represents the concentration (mass fraction) of a single element i associated with the fluorescence intensity $I_{net,i}$ whereas c represents the concentrations of all elements in the sample.

The calibration parameters for equation F8 are determined during a calibration procedure which is performed prior to the determination of mass fractions in a test sample. During the calibration procedure, the scattering efficiency s is calculated for each calibration sample and the additional correction parameter ($d_i$) is adjusted along with the other correction parameters. In other words, for finalizing the calibration equation F8, the calibration parameters are adjusted. In the above example this adjustment is performed for the parameters $a_i$ and $d_i$. For the calibration, samples with known sample properties are used. Such sample properties are primarily the concentrations (mass fractions) reflecting the elemental compositions of the calibration samples, but also other properties such as the sample geometry and density may be useful. During evaluation of a test sample, the calibration equation F8 is then used with fixed parameters to determine the mass fraction of the test sample.

It is to be noted that equation F8 shows a simplified model equation where only the two relevant parameters are shown: a and d. However, in reality such model equation for X-Ray Fluorescence (XRF) typically is more complex.

$$c_i = a_i(I_{net,i} + \Sigma_j o_{ij} c_j)(1 + \Sigma_j a_{ij} c_j) \tag{F9}$$

where $o_{ij}$ are the concentration-based overlap correction coefficients of element j on element i and $a_{ij}$ are the Lachance-Traill matrix correction coefficients of element j on element i. These corrections can also be based on the intensities of other elements or calculated from the sample composition. This herein disclosed approach is applicable to all standard-based models and/or empirical models of XRF where net intensity is used.

In one embodiment, a computer-implemented method is provided for determining mass fractions of one or more elements in a test sample based on a measurement with a wave-length dispersive x-ray fluorescence (WDX) spectrometer. The method can be executed by a computer system embodiment with modules which are configured to execute the steps of the computer implemented method. This is enabled by a computer program product embodiment having computer readable instructions that, when loaded into a memory of a computer system and executed by at least one processor of the computer system, causes the computer system to perform the computer implemented method disclosed herein. In other words, the computer program product defines the functions performed by the respective modules of the computer system.

The WDX spectrometer measures one or more gross-intensities associated with respective one or more elements with corresponding one or more to-be-determined mass fractions in the test sample. In practical applications, the number of to-be-determined mass fractions may vary significantly. In some applications, the entire elemental composition of the test sample (e.g., all elements including trace elements in said sample) is to be determined. In other applications the determination of the concentration of a single particular element in the test sample or a subset of elements is sufficient. The WDX measurement values are then received by a computer system for the sample evaluation. The computer system may be implemented as an integrated component of the WDX spectrometer or it may be communicatively coupled with the WDX spectrometer such that the measurement values can be received via standard data communication means.

The computer system then determines each of the one or more to-be-determined mass fractions by using a calibration equation with the respective measured gross intensity and a respective calculated scattering efficiency as inputs. The calibration equation has a set of calibration parameters obtained from a previous calibration step using one or more calibration samples with known elemental compositions. The calculated scattering efficiency depends on the energy of the fluorescence line of the respective element and the particular elemental composition of the test sample. The calibration equation associates the net intensities of characteristic fluorescence lines of the sample elements with respective mass fractions as illustrated by the example equation F9. Thereby, the net intensity for a particular peak is obtained by subtracting a respective calculated scattering efficiency times $d_i$ from the measured gross intensity of the particular peak. The particular elemental composition of the test sample for the calculation of the scattering efficiency can be determined by an elemental composition module of the system using one of the following alternative implementations.

In a first implementation alternative, an iteration module is used for iteratively determining mass fraction estimates for the particular elemental composition based on the measured gross-intensities associated with elements in the test sample.

Current mass fraction estimates of said elements in the test sample are initialized with arbitrary values. For example, such start values of the respective concentrations may be set to $$c_i = \frac{1}{n}$$

with i=1 ... n. Then, tor each gross intensity associated with a to-be-determined mass fraction, the iteration module computes the respective scattering efficiency using the current mass fraction estimates with the energy of the fluorescence line of the respective element.

Then, the iteration module computes the one or more to-be-determined mass fractions as the current mass fraction estimates using the calibration equation (by keeping the calibration parameters fixed). For example, when using the calibration equation F9, $d_1$, $a_i$, $o_{ij}$ and $a_{ij}$ are kept fix.

The computing steps are then repeated as long as the difference between the one or more to-be-determined mass fractions of the latest iteration and the respective one or more to-be-determined mass fractions of the preceding iteration exceed a predefined threshold. In other word, the iteration module checks after each iteration if the mass fraction values which were calculated in the latest iteration show a greater change over the previous iteration than the predefined threshold. Thereby, the same threshold value may be used for all mass fractions. Alternatively, element specific threshold values may be used. As long as the deviations are still exceeding the threshold value, the iteration module performs a further iteration. Otherwise, the iteration stops and the one or more mass fractions of the latest iteration are provided as the elemental composition of the test sample.

In a second implementation alternative, an EDX quantification module is used to obtain the one or more to-be-determined mass fractions from a quantification using an Energy Dispersive X-Ray (EDX) detector in addition to the WDX detector of the WDX spectrometer. In this implementation, the elemental composition needed for the calculation of the scattering efficiency can be derived from the EDX measurement and evaluation. Thereby, the measurement of the test sample with the EDX detector may be performed before measuring the sample with the WDX spectrometer, in parallel (simultaneously) with the measuring of the sample with the WDX spectrometer, or after measuring the sample with the WDX spectrometer. The simultaneous measurement is possible because the radiation emitted by the sample is emitted in all directions. Therefore, the monochromator of the WDX spectroscope and the EDX detector can be located at different locations. Typically, there are two different exit holes in the vacuum chamber where the test sample is placed. The radiation directed to the monochromator exits through one of these holes and the radiation directed to the EDX detector exits through the other hole.

It is to be noted that also the first implementation alternative may use the additional EDX detector to measure the gross intensities for said sample. However, when using the first implementation alternative, the WDX spectrometer is sufficient for iteratively determining the one or more to-be-determined mass fractions.

Further aspects of the description will be realized and attained by means of the elements and combinations particularly depicted in the appended claims. It is to be understood that both, the foregoing general description and the following detailed description are exemplary and explanatory only and are not restrictive.

DETAILED DESCRIPTION

Figure 1:
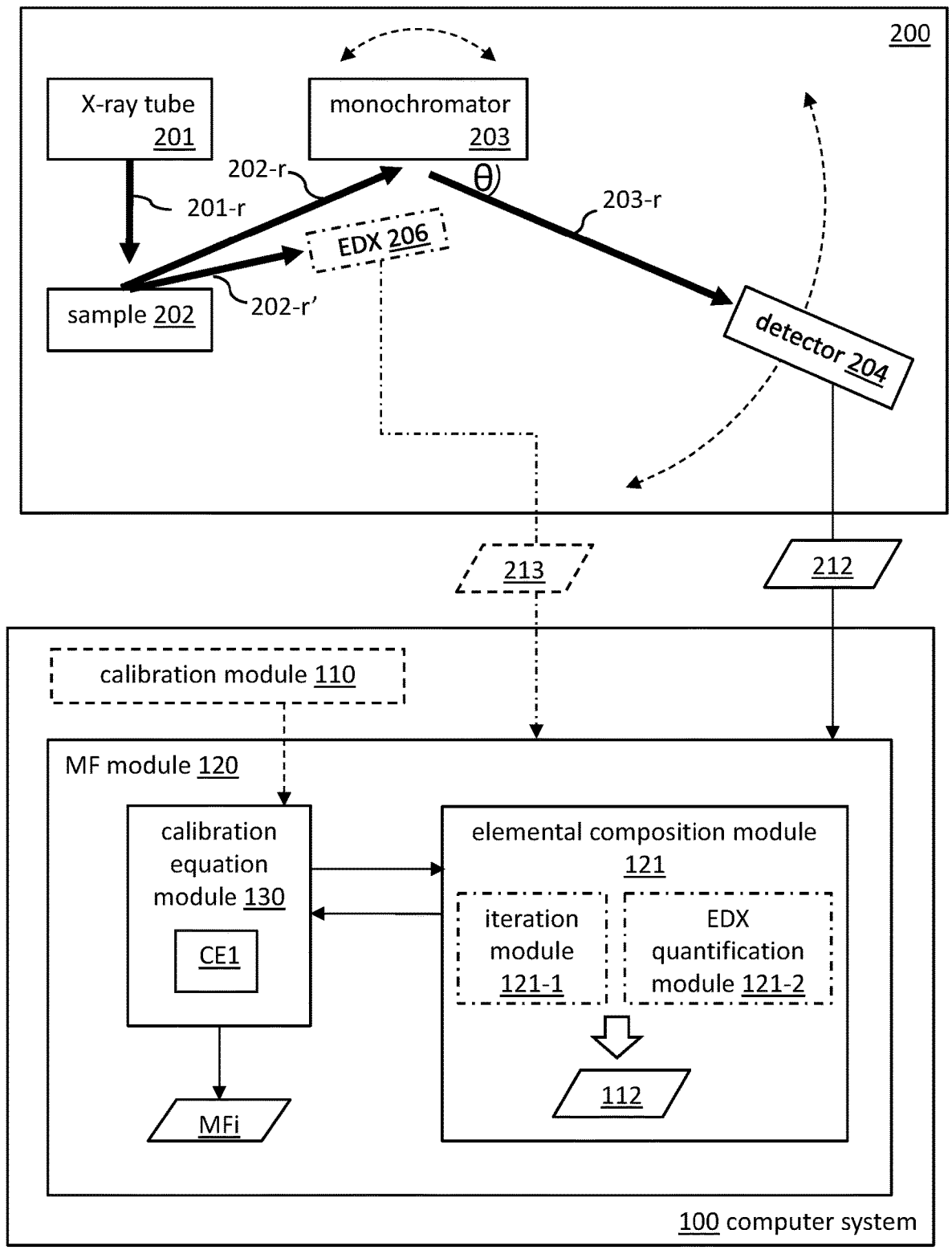
FIG. 1 includes a block diagram of an example embodiment of a computer system for determining mass fractions of one or more elements in a test sample based on a measurement of said sample with a wave-length dispersive x-ray fluorescence spectrometer.
Figure 2:
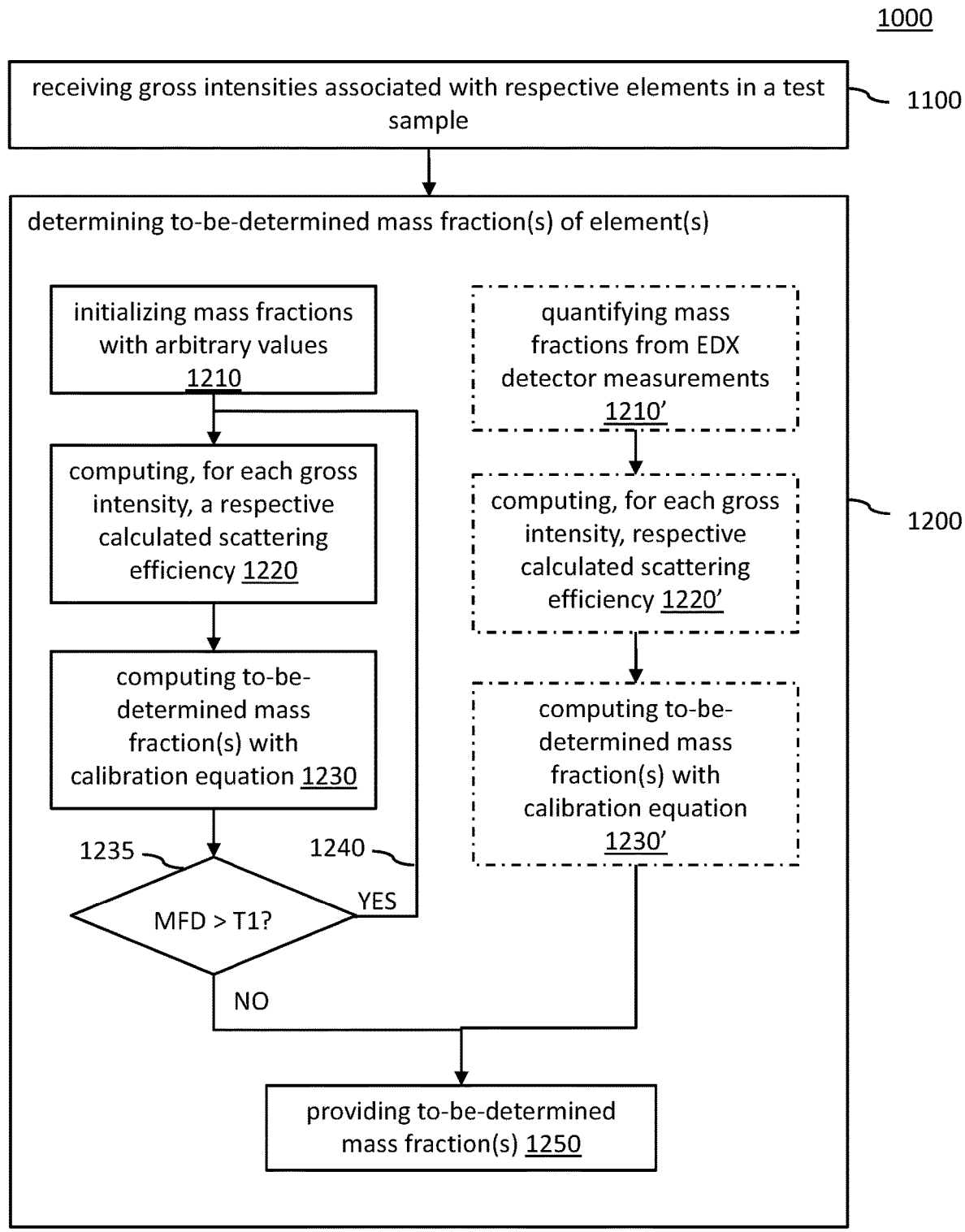
FIG. 2 is a simplified flow chart of a computer-implemented method for determining mass fractions of one or more elements in a test sample according to an embodiment.

FIG. 1 includes a block diagram of an example embodiment of a computer system 100 for determining mass fractions of one or more elements in a test sample 202 based on a measurement of said sample with a wave-length dispersive x-ray fluorescence spectrometer 200. The system 100 of FIG. 1 is described in the context of the simplified flow chart of a computer-implemented method 1000 for determining such mass fractions as illustrated in FIG. 2. Therefore, the following description refers to reference numbers used in FIG. 1 and FIG. 2. The system 100 is thereby configured to execute the method 1000 when loading a respective computer program into a memory of the system and executing said program with processing means of the system. Said computer program product implements the functional modules of the system 100 as disclosed herein.

In the example embodiment of FIG. 1, the system 100 is communicatively coupled with the spectrometer 200 via an appropriate interface (not shown). In an alternative embodiment, the computer system 100 may be an integrated component of the wave-length dispersive x-ray fluorescence spectrometer 200. In both embodiments, system 100 can receive 1100 gross intensities 212 obtained by detector 204 of the spectrometer 200 via an appropriate interface (not shown). The functioning of the spectrometer 200 has been described to a large extent in the background section. In general, a person skilled in the art knows how the spectrometer 200 can obtain the gross intensities 212 from sample 202. Nevertheless, the functioning is briefly summarized in the following with a reference to FIG. 1.

The x-ray tube 201 generates polychromatic primary radiation 201-r including characteristic lines of the tube material and Bremsstrahlung which is directed on a sample 202 to be analyzed. This primary radiation generates X-ray fluorescence emissions that are characteristic for the elements contained in the sample. Additionally, the primary radiation is scattered by the sample. The radiation 202-r emitted by the sample 202 containing X-ray fluorescence and scattered primary radiation is analyzed by measuring (via WDX detector 204), with a goniometer, the radiation 203-r reflected by the monochromator 203 of the spectrometer at various diffraction angles θ. In an alternative embodiment, an additional Energy Dispersive X-Ray (EDX) detector 206 can be integrated with the WDX spectrometer 200 to measure radiation 202-r' emitted by the sample 202. The sample emits radiation into all directions. Therefore, the exemplary beams 202-r and 202-r' represent the radiation emitted by the sample into two different directions. In one direction, the emitted radiation 202-r hits the monochromator 203. In another direction, the emitted radiation 202-r' hits the EDX detector 206 (in the alternative embodiment).

As described above, the computer system 100 is communicatively coupled to the detector 204 of the WDX spectrometer. In an alternative embodiment, the system 100 is additionally coupled to the EDX detector 206 via an appropriate interface (not shown). The computer system receives 1100 one or more gross intensities 212 associated with respective one or more elements with corresponding one or more to-be-determined mass fractions MFi in the test sample 202 obtained by the detector 204 of the WDX spectrometer 200 from said test sample 202. That is, while the goniometer of WDX spectrometer 200 changes the diffraction angle θ, the energy of the radiation 203-r also changes. In the WDX spectrometer, the goniometer is an instrument that allows the monochromator to be rotated to a precise angular position. When the detector 204 measures a peak, the energy of this peak is characteristic for a particular element in the test sample 202. The mass fraction (concentration) of this particular element is reflected by the net intensity of this peak. However, what is measured by the detector 204 is the gross intensity of the peak.

Figure 3:
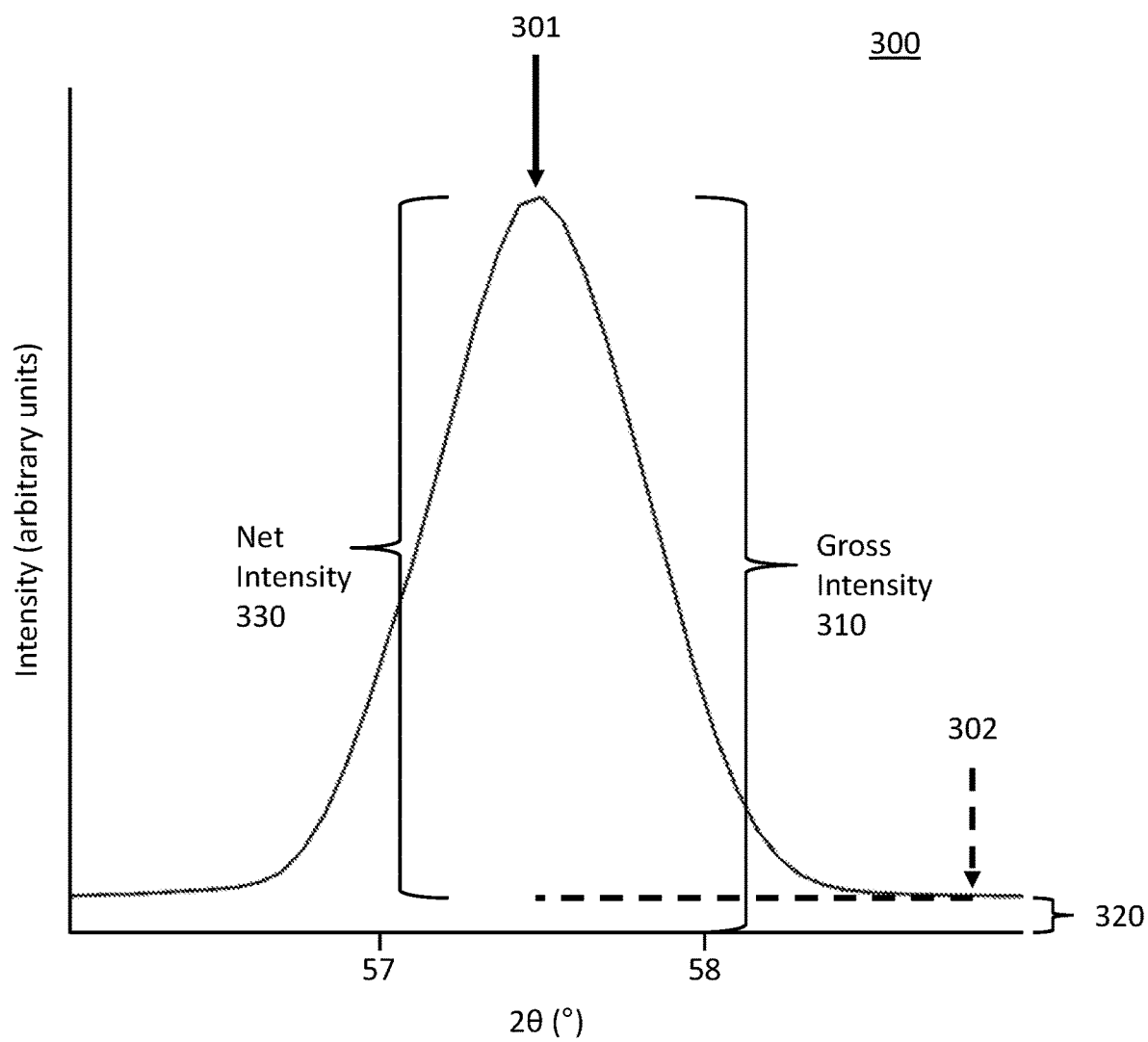
FIG. 3 illustrates the net intensity of a peak in a WDX spectrum.

This is illustrated in FIG. 3 showing a part of a schematic WDX spectrum 300. The shown part of spectrum 300 includes a peak at position 301 whose gross intensity 310 is measured at a certain diffraction angle θ. The peak represents the fluorescence emission which is characteristic for a particular element contained in the sample. The background intensity 320 which is caused by the primary scattered radiation (illustrated by the horizontal dashed line in this example) could be measured at position 302. The background is included in the gross intensity 310. The required net intensity 330 is the difference between the gross intensity 310 and the background intensity 320.

Figure 4:
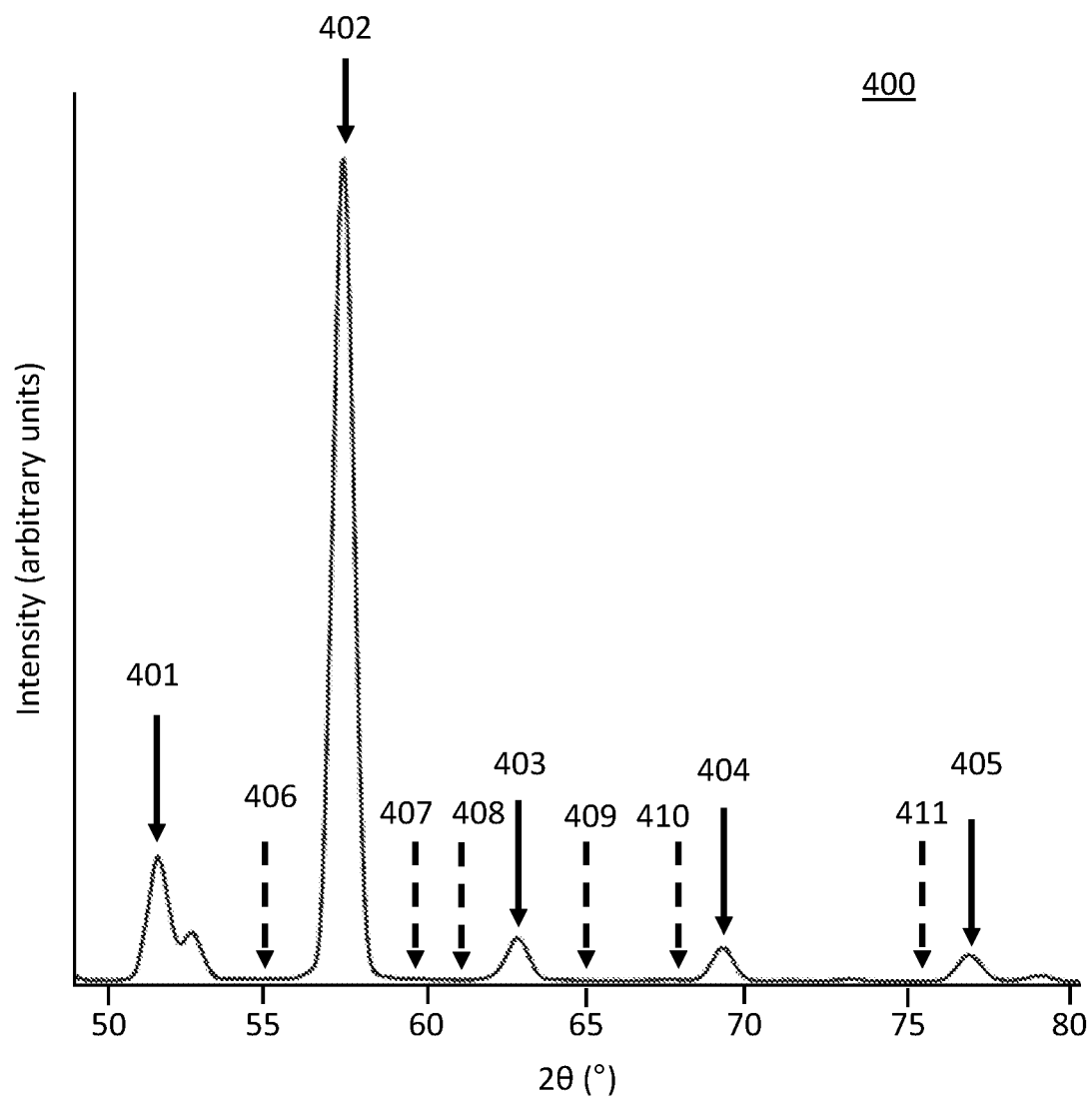
FIG. 4 illustrates a schematic WDX spectrum with peak and background positions.

Turning briefly to FIG. 4, a larger part of a schematic WDX spectrum 400 is illustrated with peak positions 401 to 405 of peaks that represent fluorescence emissions which are characteristic for elements contained in the sample (i.e., the elemental composition of said sample). The background positions 406 to 411 illustrate positions in the vicinity of the peaks which could be used as measuring points for measuring the background intensities for respective peaks.

Figure 5:
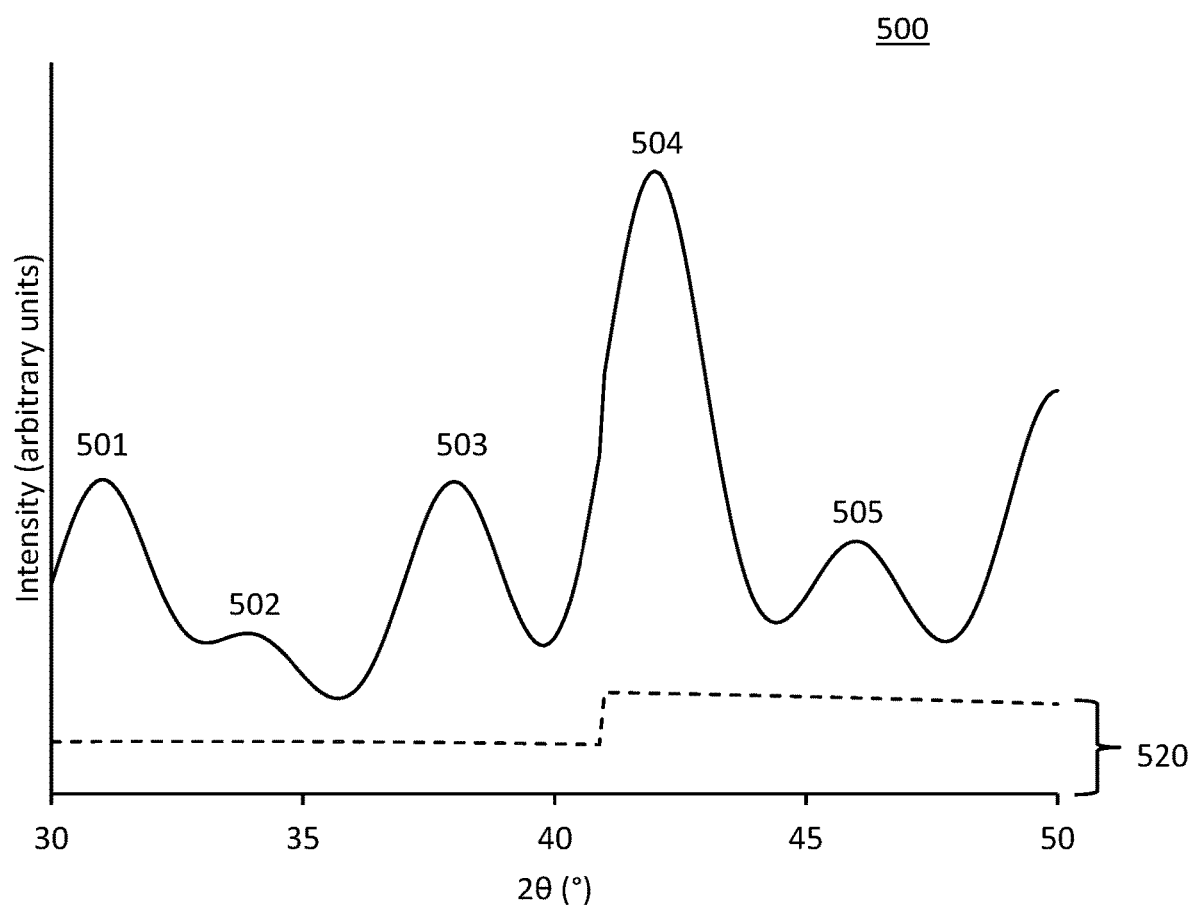
FIG. 5 illustrates overlapping peaks of an exemplary WDX spectrum hiding the background.

However, in a realistic WDX spectrum 500, as illustrated FIG. 5, peaks 501 to 505 often have overlapping regions so that the background intensity 520 (illustrated by the dashed line) is below the measured gross intensities of the peaks over large parts of the measured WDX spectrum. In other words, with such overlapping peak regions no measurement points can be found in the vicinity of the peaks where the respective background intensity could be measured. As illustrated in FIG. 5, the background intensity also varies with the energy (diffraction angle). In realistic spectra, the background intensity is not a linear function but can even include steps at certain energies as schematically shown in FIG. 5. Therefore, it would not be sufficient to measure a single background intensity value anywhere in a WDX spectrum and subtract this value from all measured peak gross intensities. Rather, for each peak, the respective background intensities would need to be measured, which is simply not possible in the example spectrum 500. To mitigate this problem, prior art approaches increase the resolution of the measurement by using a different crystal (e.g., LiF220 instead of LiF200), or by using a smaller collimator that restricts the angular divergence of the beam hitting the monochromator. However, both prior art approaches reduce the overall intensity quite significantly and thus increase overall measurement time which is contrary to the objective to allow measurements in time critical applications, such as steel production. It is to be noted that the schematic spectra in FIGS. 3 to 5 show continuous spectrum lines. However, in a real WDX measurement application, measurements are only taken at the specific energy positions which are indicated as solid arrows in FIGS. 3 and 4. For reasons of simplicity, such specific energy positions are not highlighted in FIG. 5. However, a person skilled in the art will know where the measurement points are to be positioned.

Therefore, the herein disclosed approach calculates the background intensities as described in the following to eliminate the need for background intensity measurements entirely.

The system 100 has a mass fraction module 120 adapted to determine 1200 each of the one or more to-be-determined mass fractions MFi by using a calibration equation CE1 with the respective measured gross intensity 212 and respective calculated scattering efficiencies 112 as inputs. As mentioned earlier, the calculated scattering efficiency is defined as the ratio between incoming intensity and scattered intensity for a particular elemental composition (of the test sample) and energy.

The calibration equation CE1 (cf., FIG. 1) associates net intensities of characteristic fluorescence lines of the sample elements with respective mass fractions. The calibrating equation F9:

$$c_i = a_i(I_{peak,i} - d_i s(c,E) + \Sigma_j o_{ij} c_j)(1 + \Sigma_j a_{ij} c_j)$$

illustrates that the net intensity for a particular peak i is obtained by subtracting the respective calculated scattering efficiency $s(c, E)$ times a scaling factor $d_i$ from the measured gross intensity $I_{peak,i}$ of the particular peak. For deriving the calibration equation, calibration samples of known elemental compositions (standards) are measured with the WDX spectrometer. Thereby, the concentrations of said standards were determined with other measurement techniques. Using such measurements, one can empirically determine $d_i$ and the other parameters $a_i$, $o_{ij}$ and $a_{ij}$ while keeping the concentrations of each standard fixed. For the standards, the elemental composition c is known. That is, during calibration, the scattering efficiency s is calculated for each standard and the additional correction parameters $d_i$ is adjusted along with the other correction parameters $a_i$, $o_{ij}$ and $a_{ij}$. In other words, the respective parameters are determined based on the known properties of the standards (e.g., concentrations, geometry, density). The system may store different calibration parameters for different sample types (samples with different elemental compositions) in the calibration equation module 130 where the calibration parameters in the calibration equations may have different values for respective sample types. For example, the system may further comprise a calibration module 110 which is configured to perform the above-described calibration step based on WDX measurement data obtained from respective standards.

During evaluation of the test sample 202, the calibration equation CE1 is used with fixed parameters to determine the mass fractions of the unknown test sample. In the calibration equation, the elemental composition is an input parameter to calculate the scattering efficiency. On the other hand, system 100 is for determining mass fractions of one or more elements in that test sample. This looks like a contradiction as the to-be-determined elemental composition of the test sample requires the knowledge of said elemental composition. However, the accuracy in the mass fractions of the elements required for the calculation of the scattering efficiency is far lower than the accuracy typically required for the final mass fraction result(s) to be determined for the one or more elements of the test sample 202. Therefore, the mass fractions of the particular elemental composition used for the calculation of the scattering efficiency is referred to mass fraction estimates. For the calculation of the scattering efficiency trace elements can be entirely ignored. In other words, it is sufficient to have estimates only for such elements with mass fractions exceeding a threshold value being characteristic for trace element mass fractions (e.g., only mass fractions of at least one percent). These elements are referred to as relevant elements herein. Trace elements in the test sample are irrelevant for the calculation of the scattering efficiency (and therefore the background intensity).

The elemental composition estimates of the test sample with the accuracy as required for calculation the scattering efficiency can be obtained by two alternative implementations of an elemental composition module 121 of system 100. In a first implementation, the elemental composition module 121 uses iteration module 121-1 adapted to execute an iterative method to estimate the elemental composition of the test sample. The iterative method is illustrated as a loop structure in the left branch of the determining 1200 step of FIG. 2. Before starting the loop 1240, the iteration module initializes 1210 current mass fraction estimates of the elements with arbitrary values. That is, the initial elemental composition which is used during a first iteration step for computing 1220 the calculated scattering efficiency includes arbitrary values for the concentrations of elements in the test sample. For example, the relevant elements may already be known from the sample type of the test sample. This calculated scattering efficiency is computed 1220 for each gross intensity associated with a to-be-determined mass fraction. That is, in this implementation, the gross intensities of the relevant peaks in WDX spectrum are determined via the detector 204 by performing WDX measurements at the respective energies (i.e., at diffraction angles corresponding to the corresponding peak positions). The diffraction angles are adjusted accordingly using a goniometer with the monochromator 203. Thereby, the respective calculated scattering efficiency uses the current mass fraction estimates with the energy of the fluorescence line of the respective element. In other words, in the first iteration it uses the arbitrary mass fraction values from the initialization.

In the loop, the iteration module then computes 1230 the one or more to-be-determined mass fractions as the current mass fractions by using the calibration equation CE1 with respectively computed scattering efficiencies. That is, the values of the current mass fraction estimates (during the first iteration: the arbitrary values from the initialization) are now overwritten by the mass fraction values resulting from computing step 1230.

The iteration module now performs a check 1235 whether the mass fraction difference MFD between the one or more to-be-determined mass fractions of the latest iteration and the respective one or more to-be-determined mass fractions of the preceding iteration exceed a predefined threshold T1. In the first iteration, the mass fractions of the preceding iteration correspond to the arbitrary mass fraction values of the initialization. It is highly unlikely that after the first iteration MFD would already be smaller than or equal to the predefined threshold. This could only happen if the arbitrary mass fraction values of the initialization are already an almost perfect match with the elemental composition prevailing in the test sample. In case MFD is greater than T1, the iteration module performs the next iteration by repeating 1240 the computing steps 1220, 1230.

With each iteration, the computation 1230 of the to-be-determined mass fractions on the basis of the elemental composition as estimated in the previous iteration comes closer to the actual elemental composition of the test sample. In other words, in each iteration, the determined concentrations of the relevant elements in the test sample are closer to the actual real-world concentrations than the concentrations estimated during the previous iteration. The iteration module continues with the loop 1240 until the check function 1235 determines finally that the MFD has become smaller than or equal to the predefined threshold. Then, the termination condition of the loop 1240 is fulfilled and the estimated mass fraction values computed 1230 in the last iteration are provided 1250 as the to-be-determined mass fractions.

As this implementation requires the WDX measurement of the gross-intensities of all relevant element peaks, it can be advantageously used in scenarios where anyway a large number of mass fractions is to be determined form the measured WDX spectrum. The measurement time which would be needed in prior art approaches to measure background intensities in the vicinities of the relevant element peaks is saved. Further, in complex spectra with many overlays in the relevant peaks background intensities could not be measured at all. However, the implementation via the iteration module still allows to determine the mass fractions of all elements in the test sample (including trace elements) via the respective calculated scattering efficiencies which may be based on the relevant elements only.

In the alternative implementation, elemental composition module 121 uses EDX quantification module 121-2 for determining the elemental composition of the test sample for the purpose of computing the calculated scattering efficiencies 112 for the respective peaks. The steps performed by the EDX quantification module 121-2 are shown with dash-dotted frames in FIG. 2 on the right hand of step 1200. In this implementation, the EDX quantification module obtains the one or more to-be-determined mass fractions via a quantification using a measurement result 213 of the Energy Dispersive X-Ray detector 206 (EDX detector). The EDX detector can be used to quickly obtain a sufficiently accurate estimate of the concentrations of all relevant elements for the purpose of calculated the scattering efficiencies at the relevant peaks. The gross intensities for determining highly accurate to-be-determined mass fractions are still obtained with the WDX detector 204. The EDX detector is merely used to speed up the determination of the elemental composition which is required as an input for computing the calculated scattering efficiencies. The quantifying 1210' of mass fractions from EDX detector measurements is known in the art. This quantifying step 1210' allows to determine the elemental composition estimate separately from the WDX measurements of the peak gross intensities 212.

The computing steps 1220' and 1230' correspond to the steps 1220, 1230 performed in a single iteration of loop 1240. In the EDX embodiment, no iteration is necessary as the elemental composition for calculating the scattering intensities in step 1220' is already known from the EDX measurement. To compute the mass fractions based on the determined net intensities of the respective peaks, the measured gross intensities of the peaks and the calculated scattering intensities are used as inputs for the calibration equation CE1. This leads directly to the mass fraction values An indicator for a good quality of the calibration parameters is achieved, when all differences are close to zero. A positive difference at zero percent entered Sc mass fraction means, that an evaluated sample with actually zero mass fraction of Sc will give a positive, non-zero result (false positive).

$c_{sc} = a_{sc}(I_{net,Sc}) \, m_{Sc} a_{Sc} m_{Sc} I_{net,Sc} I_{gross,Sc} I_{peak,Sc} - I_{bkg,Sc} I_{peak,Sc} - d_{Sc} s(c,E)$ The calibration equation in this example is:

$$c_{sc} = a_{sc}(I_{net,Sc}) m_{Sc} a_{Sc} m_{Sc} I_{net,Sc} I_{gross,Sc} I_{peak,Sc} - I_{bkg,Sc} I_{peak,Sc} - d_{Sc} s(c,E),$$

where is the slope and is the matrix correction. is for "No Bkg", for "Measured Bkg" and for "Theoretical Bkg". All samples contain BaO, $TiO_2$ and $Sc_2O_3$ in different concentrations fused into a borate glass bead.

Figure 6A:
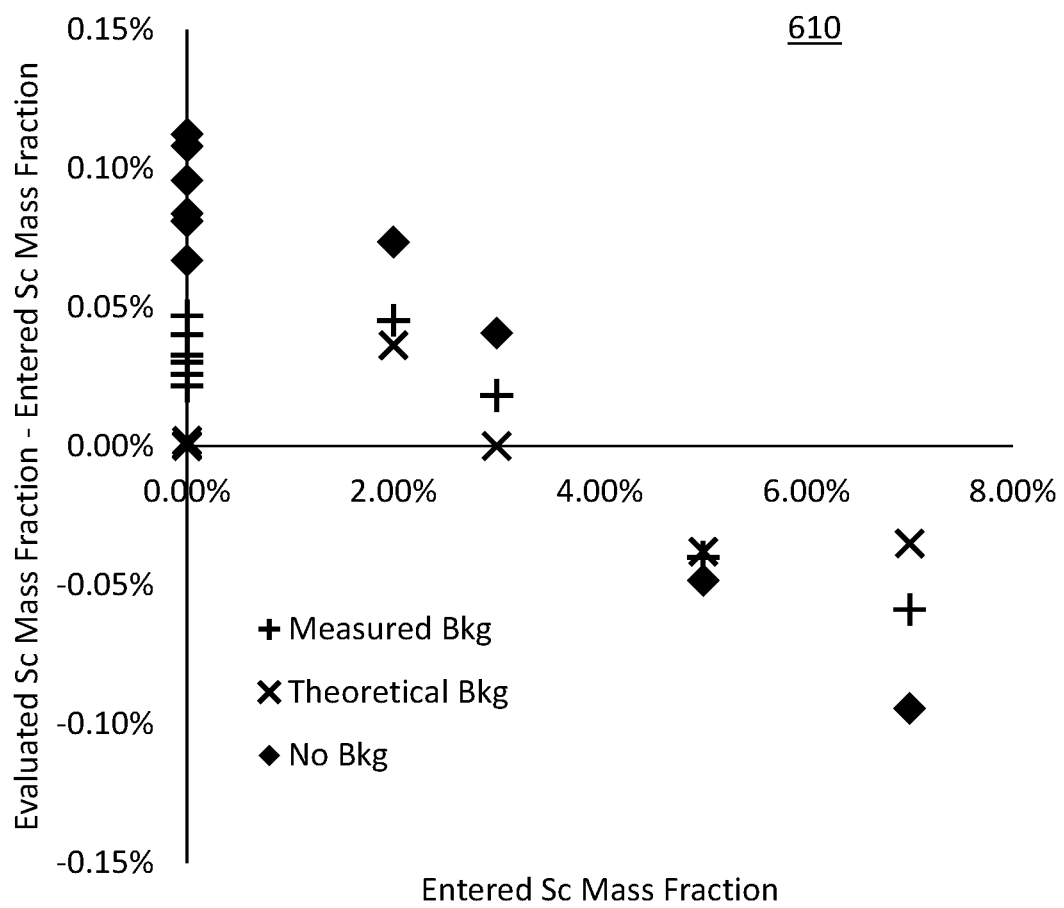
FIG. 6A illustrates Sc mass fraction deviation of reevaluated standard samples.

TABLE 1 includes the values which are plotted in FIG. 6A

| Entered Sc Mass Fraction | Evaluated Sc Mass Fraction without Background | Difference | Evaluated Sc Mass Fraction with Measured Background | Difference | Evaluated Sc Mass Fraction with Theoretical Background | Difference |
|---|---|---|---|---|---|---|
| 0.00% | 0.07% | 0.07% | 0.02% | 0.02% | 0.00% | 0.00% |
| 0.00% | 0.08% | 0.08% | 0.03% | 0.03% | 0.00% | 0.00% |
| 0.00% | 0.11% | 0.11% | 0.05% | 0.05% | 0.00% | 0.00% |
| 0.00% | 0.11% | 0.11% | 0.04% | 0.04% | 0.00% | 0.00% |
| 0.00% | 0.10% | 0.10% | 0.03% | 0.03% | 0.00% | 0.00% |
| 0.00% | 0.08% | 0.08% | 0.03% | 0.03% | 0.00% | 0.00% |
| 2.00% | 2.07% | 0.07% | 2.05% | 0.05% | 2.04% | 0.04% |
| 3.00% | 3.04% | 0.04% | 3.02% | 0.02% | 3.00% | 0.00% |
| 5.00% | 4.95% | −0.05% | 4.96% | −0.04% | 4.96% | −0.04% |
| 7.00% | 6.91% | −0.09% | 6.94% | −0.06% | 6.96% | −0.04% | for the to-be-determined mass fractions MFi. Thereby, for the MF module 120 it makes no difference, whether the measurement of the test sample 202 with the EDX detector 206 is performed before, simultaneously with or after measuring the sample with the detector 204 of the WDX spectrometer. The simultaneous measurement is advantageous in that no additional time losses occur, whereas when performing EDX and WDX measurements subsequently, the time of both measurements is needed before the computation of the mass fractions can be executed. The mass fraction results can be provided 1250 by the MF module 120, for example via a user interface, to an operator of a production system. The determined mass fractions may also be used to generate control instructions for the process control of an industrial process.

Figure 6B:
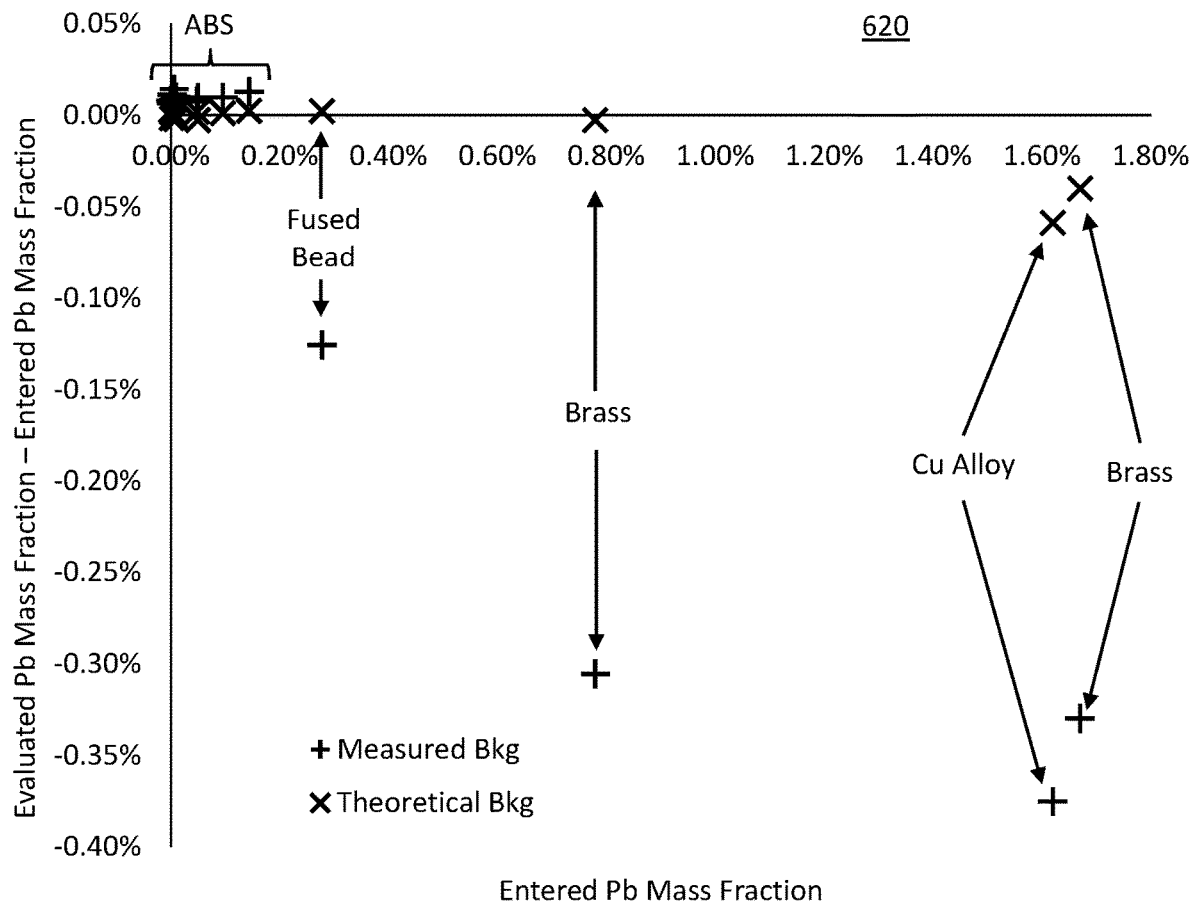
FIG. 6B illustrates Pb mass fraction deviation of reevaluated standard samples.

FIGS. 6A, 6B illustrate mass fraction deviations of reevaluated standard samples for two different elements. The mass fractions of the standard samples were known from other measurements (Entered SC/PB Mass Fraction). These standard samples were used to determine the calibration parameters in the respective calibration equations. The mass fractions of Sc in FIG. 6A of were determined with three different methods: entirely ignoring the background intensity (rhombus symbol: No Bkg), using measured background intensities in the vicinity of the respective element peak (+ symbol: Measured Bkg), and using the herein disclosed approach based on calculated scattering efficiencies (x symbol: Theoretical Bkg). In FIG. 6B the mass fractions of Pb were determined by only using Measured Bkg (+) and Theoretical Bkg (x).

Graph 610 in FIG. 6A shows the difference between the to-be-determined (evaluated) mass fraction of Sc and the entered (nominal) Sc mass fraction of the standards (y-axis) over the entered Sc mass fraction of the standard (x-axis).

No Background is showing a clear trend of positive differences below 4% Sc mass fraction and negative differences above 4%. This indicates that there is a systematic error, here the missing background correction. At 0% entered Sc mass fraction, using no background leads to significant false positives.

Using an intensity in the vicinity of the Sc KA peak as a measured background (Measured Bkg) already gives a better result. However, still a similar trend can be observed and the false positives are still visible.

Using the herein disclosed Theoretical Background (Theoretical Bkg) approach based on calculated scattering efficiencies gives the best results and no false positives. It is to be emphasized that the results obtained with the herein disclosed calculated background intensities are even far more accurate than the results obtained from the prior art approach where the background intensity is directly measured in the vicinity of the respective element peak.

$c_{pb} = a_{Pb}(I_{net,Pb} + o_{Pb}) m_{Pb} a_{Pb} o_{Pb} m_{Pb} I_{net,Pb} i_{peak,Pb} - I_{bkg,Pb} I_{peak,Pb} - d_{pb} s(c,E)$ Graph 620 in FIG. 6B illustrates a similar result for Pb mass fractions in standard samples. However, graph 620 does not include the values for mass fractions determined with no background since the errors are too large to be depicted in graph 620. The calibration equation in this example is:

$$c_{pb} = a_{Pb}(I_{net,Pb} + o_{Pb}) m_{Pb} a_{Pb} o_{Pb} m_{Pb} I_{net,Pb} I_{peak,Pb} - I_{bkg,Pb} I_{peak,Pb} - d_{pb} s(c,E),$$

where is the slope, is the overlap correction and is the matrix correction. is for "Measured Bkg" and for "Theoretical Bkg". Very different types of standards—plastics (ABS), fused borate glass beads (Fused Bead) and alloys (Brass and Cu Alloy) are part of the calibration. All standards show substantially different background contributions.

TABLE 2 includes the values which are plotted in FIG. 6B

| Entered Pb Mass Fraction | Sample Type | Evaluated Pb Mass Fraction with Measured Background | Difference | Evaluated Pb Mass Fraction with Theoretical Background | Difference |
|---|---|---|---|---|---|
| 0.001% | ABS | 0.008% | 0.008% | 0.003% | 0.003% |
| 0.002% | ABS | 0.008% | 0.007% | 0.000% | −0.002% |
| 0.002% | ABS | 0.014% | 0.011% | 0.004% | 0.001% |
| 0.006% | ABS | 0.020% | 0.014% | 0.006% | 0.000% |
| 0.009% | ABS | 0.019% | 0.010% | 0.007% | −0.002% |
| 0.048% | ABS | 0.056% | 0.008% | 0.050% | 0.002% |
| 0.050% | ABS | 0.059% | 0.010% | 0.047% | −0.003% |
| 0.095% | ABS | 0.105% | 0.010% | 0.096% | 0.001% |
| 0.143% | ABS | 0.156% | 0.013% | 0.146% | 0.002% |
| 0.278% | Fused Bead | 0.152% | −0.126% | 0.280% | 0.002% |
| 0.780% | Brass | 0.475% | −0.305% | 0.777% | −0.003% |
| 1.620% | Cu Alloy | 1.245% | −0.375% | 1.561% | −0.059% |
| 1.670% | Brass | 1.340% | −0.330% | 1.630% | −0.040% |

Using an intensity in the vicinity of the Pb LA peak as a measured background shows low differences for all ABS samples but high differences for all other sample types. This results from the problem to find an undisturbed region in the spectrum, where the measured background intensity is representative for the actual background (see FIG. 5). Using the herein disclosed Theoretical Background approach gives the best result, being able to provide a good background estimate for all the different sample types.

Figure 7:
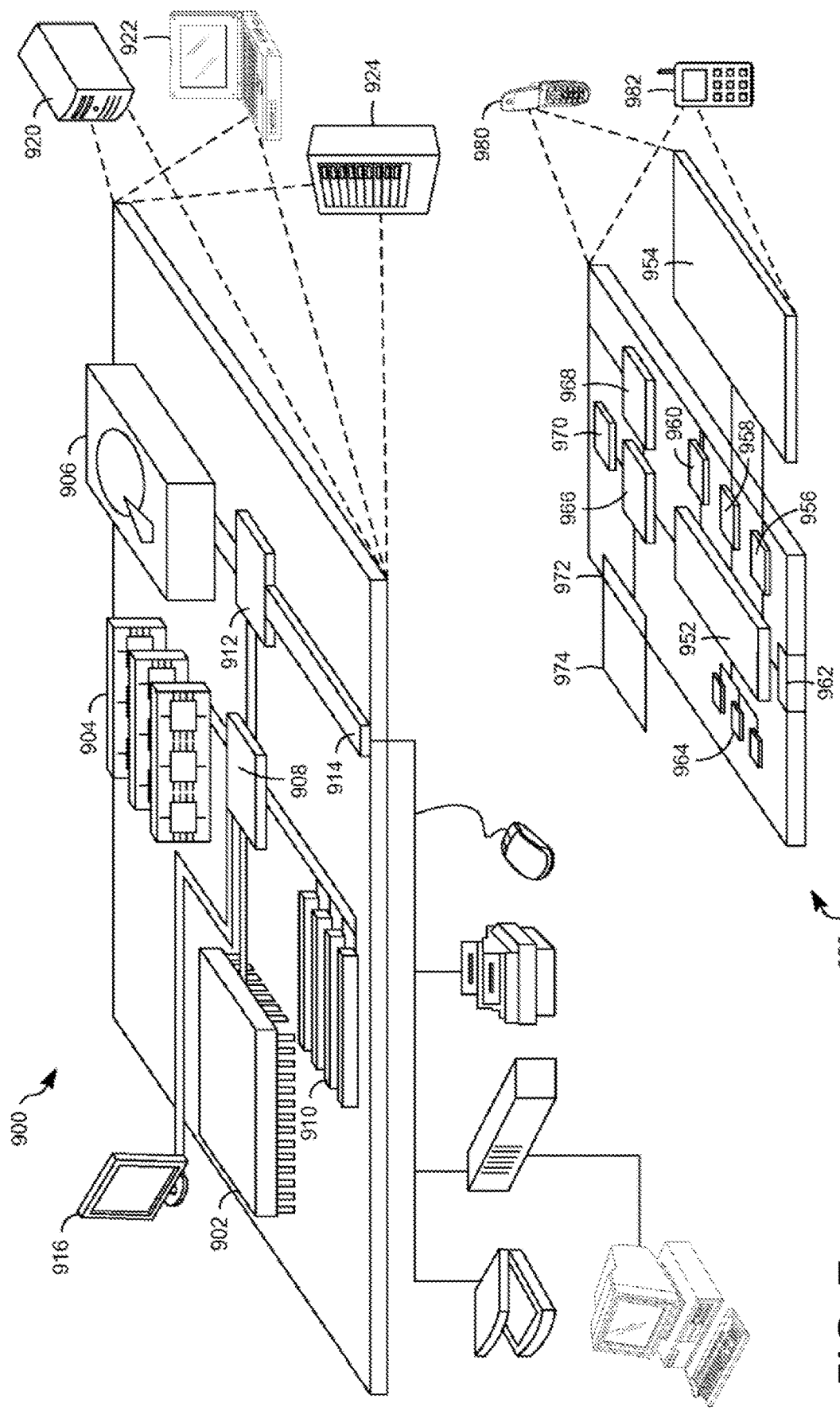
FIG. 7 is a diagram that shows an example of a generic computer device and a generic mobile computer device, which may be used with the techniques described herein.

FIG. 7 is a diagram that shows an example of a generic computer device 900 and a generic mobile computer device 950, which may be used with the techniques described here. In some embodiments, computing device 900 may relate to system 100 (cf. FIG. 1). As mentioned earlier, such a computer device 900 may be implemented as an integrated component of a wave-length dispersive X-ray fluorescence spectrometer. Computing device 950 is intended to represent various forms of mobile devices, such as personal digital assistants, cellular telephones, smart phones, and other similar computing devices. In the context of this disclosure the computing device 950 may provide I/O means for a user to interact with the computing device 950 (e.g., for selecting the diffraction orders used for the analysis of the sample). The components shown here, their connections and relationships, and their functions, are meant to be exemplary only, and are not meant to limit implementations described and/or claimed in this document.

Computing device 900 includes a processor 902, memory 904, a storage device 906, a high-speed interface 908 connecting to memory 904 and high-speed expansion ports 910, and a low-speed interface 912 connecting to low-speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high-speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high-speed controller 908 manages bandwidth-intensive operations for the computing device 900, while the low-speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 984 may also be provided and connected to device 950 through expansion interface 982, which may include, for example, a SIMM (Single In Line Memory Module) card interface. Such expansion memory 984 may provide extra storage space for device 950, or may also store applications or other information for device 950. Specifically, expansion memory 984 may include instructions to carry out or supplement the processes described above, and may include secure information also. Thus, for example, expansion memory 984 may act as a security module for device 950, and may be programmed with instructions that permit secure use of device 950. In addition, secure applications may be provided via the SIMM cards, along with additional information, such as placing the identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 980 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

The invention claimed is:

1. A computer-implemented method for determining mass fractions of one or more elements in a test sample based on a measurement with a wave-length dispersive x-ray fluorescence spectrometer, referred to as WDX spectrometer, comprising:
   receiving, from a detector of the WDX spectrometer, one or more gross intensities associated with respective one or more elements with corresponding one or more to-be-determined mass fractions (MFi) in the test sample; and
   determining each of the one or more to-be-determined mass fractions (MFi) by using a calibration equation (CE1) with the respective measured gross intensity and a respective calculated scattering efficiency as inputs, wherein the calculated scattering efficiency is defined as a ratio between incoming intensity and scattered intensity for a particular elemental composition and energy, the calibration equation (CE1) associating net intensities of characteristic fluorescence emission lines of the sample elements with respective mass fractions, wherein the net intensity for a particular peak is obtained by subtracting the respective calculated scattering efficiency times a scaling factor from the calibration equation (CE1) from the measured gross intensity of the particular peak, with the particular elemental composition of the test sample being estimated by either:
      iteratively determining mass fraction estimates for the particular elemental composition based on the measured gross intensities associated with elements in the test sample; or
      obtaining mass fraction estimates for the particular elemental composition from a quantification using an Energy Dispersive X-Ray detector, referred to as EDX detector.

2. The method of claim 1, wherein the calibration equation (CE1) has a set of calibration parameters obtained from a previous calibration step using one or more calibration samples with known elemental compositions.

3. The method of claim 2, wherein in the previous calibration step, the parameters of the calibration equation are adjusted based on known properties of the one or more calibration samples.

4. The method of claim 1, wherein iteratively determining mass fraction estimates for the particular elemental composition comprises:
   initializing current mass fraction estimates of the elements with arbitrary values;
   computing, for each gross intensity associated with a to-be-determined mass fraction, the respective calculated scattering efficiency using the current mass fraction estimates with the energy of the fluorescence line of the respective element;
   computing, with the calibration equation, the one or more to-be-determined mass fractions as the current mass fraction estimates;
   repeating the computing of the respective calculated scattering efficiency and of the current mass fraction estimates as long as a mass fraction difference (MFD) between the one or more to-be-determined mass fractions of a latest iteration and the respective one or more to-be-determined mass fractions of a preceding iteration exceed a predefined threshold (T1).

5. The method of claim 1, wherein, for iteratively determining the one or more to-be-determined mass fractions, gross-intensities are measured by the detector of the WDX spectrometer or by the EDX detector.

6. The method of claim 1, wherein obtaining the one or more to-be-determined mass fractions from a quantification using an EDX detector comprises any one of the following:
   measuring the test sample with the EDX detector before measuring the sample with the detector of the WDX spectrometer,
   measuring the test sample with the EDX detector in parallel with the measuring of the sample with the detector of the WDX spectrometer, and
   measuring the test sample with the EDX detector after measuring the sample with the detector of the WDX spectrometer.

7. The method of claim 1, wherein the elemental composition of the test sample being used for determining calculated scattering efficiencies is limited to elements in the test sample with a mass fraction exceeding a predefined threshold.

8. A computer system for determining mass fractions of one or more elements in a test sample based on a measurement with a wave-length dispersive x-ray fluorescence spectrometer, referred to as WDX spectrometer, comprising:
   an interface adapted to receive one or more gross intensities associated with respective one or more elements with corresponding one or more to-be-determined mass fractions (MFi) in the test sample obtained by a detector (204) of the WDX spectrometer from said test sample;
   a mass fraction module adapted to determine each of the one or more to-be-determined mass fractions (MFi) by using a calibration equation (CE1) with the respective measured gross intensity and a respective calculated scattering efficiency as inputs, wherein the calculated scattering efficiency is defined as a ratio between incoming intensity and scattered intensity for a particular elemental composition and energy, the calibration equation (CE1) associating net intensities of characteristic fluorescence emission lines of the sample elements with respective mass fractions, wherein the net intensity for a particular peak is obtained by subtracting a respective calculated scattering efficiency times a scaling factor from the calibration equation (CE1) from the measured gross intensity of the particular peak;

an elemental composition module adapted to estimate the particular elemental composition of the test sample either:
- via an iteration module adapted to iteratively determine mass fraction estimates for the particular elemental composition based on the measured gross intensities associated with elements in the test sample; or
- via an EDX quantification module adapted to obtain mass fraction estimates for the particular elemental composition from a quantification using an Energy Dispersive X-Ray detector, referred to as EDX detector.

9. The system of claim 8, wherein the calibration equation (CE1) has a set of calibration parameters obtained from a previous calibration step using one or more calibration samples with known elemental compositions.

10. The system of claim 9, further comprising a calibration module configured to perform the previous calibration step to adjust the parameters of the calibration equation based on known properties of the one or more calibration samples.

11. The system of claim 8, wherein the iteration module for iteratively determining mass fraction estimates for the particular elemental composition is adapted to:
- initialize current mass fraction estimates of the elements with arbitrary values;
- compute, for each gross intensity associated with a to-be-determined mass fraction, the respective calculated scattering efficiency using the current mass fraction estimates with the energy of the fluorescence line of the respective element;
- compute, with the calibration equation, the one or more to-be-determined mass fractions as the current mass fraction estimates; and
- repeat the computing of the respective calculated scattering efficiency and of the current mass fraction estimates as long as a mass fraction difference (MFD) between the one or more to-be-determined mass fractions of a latest iteration and a respective one or more to-be-determined mass fractions of a preceding iteration exceed a predefined threshold (T1).

12. The system of claim 8, wherein gross intensities used by the iteration module are measured by the WDX spectrometer or by the EDX detector.

13. The system of claim 8, wherein the one or more to-be-determined mass fractions obtained via the EDX quantification module are based on any of the following:
- a measurement of the test sample with the EDX detector before measuring the sample with the detector of the WDX spectrometer,
- a measurement of the test sample with the EDX detector in parallel with the measuring of the sample with the detector of the WDX spectrometer, and
- a measurement of the test sample with the EDX detector after measuring the sample with the detector of the WDX spectrometer.

14. The system of claim 8, wherein the elemental composition of the test sample being used for determining calculated scattering efficiencies is limited to elements in the test sample with a mass fraction exceeding a predefined threshold.

15. A computer program product for determining mass fractions of one or more elements in a test sample based on a measurement with a wave-length dispersive x-ray fluorescence spectrometer, referred to as WDX spectrometer, the computer program product being tangibly embodied on a computer-readable storage medium and including computer readable instructions that, when loaded into a memory of a computing device and executed by at least one processor of the computing device, causes the computing device to:
- receive, from a detector of the WDX spectrometer, one or more gross intensities associated with respective one or more elements with corresponding one or more to-be-determined mass fractions (MFi) in the test sample; and
- determine each of the one or more to-be-determined mass fractions (MFi) by using a calibration equation (CE1) with the respective measured gross intensity and a respective calculated scattering efficiency as inputs, wherein the calculated scattering efficiency is defined as a ratio between incoming intensity and scattered intensity for a particular elemental composition and energy, the calibration equation (CE1) associating net intensities of characteristic fluorescence emission lines of the sample elements with respective mass fractions, wherein the net intensity for a particular peak is obtained by subtracting the respective calculated scattering efficiency times a scaling factor from the calibration equation (CE1) from the measured gross intensity of the particular peak, with the particular elemental composition of the test sample being estimated by either:
  - iteratively determining mass fraction estimates for the particular elemental composition based on the measured gross intensities associated with elements in the test sample; or
  - obtaining mass fraction estimates for the particular elemental composition from a quantification using an Energy Dispersive X-Ray detector, referred to as EDX detector.

16. The computer program product of claim 15, wherein the calibration equation (CE1) has a set of calibration parameters obtained from a previous calibration step using one or more calibration samples with known elemental compositions.

17. The computer program product of claim 15, wherein iteratively determining mass fraction estimates for the particular elemental composition comprises:
- initializing current mass fraction estimates of the elements with arbitrary values;
- computing, for each gross intensity associated with a to-be-determined mass fraction, the respective calculated scattering efficiency using the current mass fraction estimates with the energy of the fluorescence line of the respective element;
- computing, with the calibration equation, the one or more to-be-determined mass fractions as the current mass fraction estimates;
- repeating the computing of the respective calculated scattering efficiency and of the current mass fraction estimates as long as a mass fraction difference (MFD) between the one or more to-be-determined mass fractions of a latest iteration and the respective one or more to-be-determined mass fractions of a preceding iteration exceed a predefined threshold (T1).

18. The computer program product of claim 15, wherein, for iteratively determining the one or more to-be-determined mass fractions, gross-intensities are measured by the detector of the WDX spectrometer or by the EDX detector.

19. The computer program product of claim 15, wherein obtaining the one or more to-be-determined mass fractions from a quantification using an EDX detector comprises any one of the following:
- measuring the test sample with the EDX detector before measuring the sample with the detector of the WDX spectrometer,
- measuring the test sample with the EDX detector in parallel with the measuring of the sample with the detector of the WDX spectrometer, and
- measuring the test sample with the EDX detector after measuring the sample with the detector of the WDX spectrometer.

20. The computer program product of claim 15, wherein the elemental composition of the test sample being used for determining calculated scattering efficiencies is limited to elements in the test sample with a mass fraction exceeding a predefined threshold.

* * * * *